(12) United States Patent
Wuidart

(10) Patent No.: US 8,988,196 B2
(45) Date of Patent: Mar. 24, 2015

(54) POWER RECOVERY BY AN ELECTROMAGNETIC TRANSPONDER

(75) Inventor: Luc Wuidart, Pourrières (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 724 days.

(21) Appl. No.: 13/378,614

(22) PCT Filed: Jun. 3, 2010

(86) PCT No.: PCT/FR2010/051090
§ 371 (c)(1),
(2), (4) Date: Dec. 15, 2011

(87) PCT Pub. No.: WO2010/146277
PCT Pub. Date: Dec. 23, 2010

(65) Prior Publication Data
US 2012/0105012 A1    May 3, 2012

(30) Foreign Application Priority Data

Jun. 19, 2009 (FR) ...................................... 09 54148

(51) Int. Cl.
*G06K 19/07*    (2006.01)
(52) U.S. Cl.
CPC ........ *G06K 19/0723* (2013.01); *G06K 19/0701* (2013.01); *G06K 19/0702* (2013.01); *G06K 19/0715* (2013.01); *G06K 19/0726* (2013.01)
USPC ... 340/10.3; 340/10.1; 340/572.4; 340/572.5; 455/41.1; 455/125
(58) Field of Classification Search
CPC .......... G06K 19/0701; G06K 19/0702; G06K 19/0707; G06K 19/0712; G06K 19/0715; G06K 19/0723; G06K 19/0726

USPC ......... 340/10.1, 10.3, 572.4, 572.5; 455/41.1, 455/125
See application file for complete search history.

(56) References Cited

U.S. PATENT DOCUMENTS

| | | | |
|---|---|---|---|
| 6,462,647 B1 | 10/2002 | Roz | |
| 6,473,028 B1 | 10/2002 | Luc | |
| 6,547,149 B1* | 4/2003 | Wuidart et al. | ............... 235/492 |
| 6,650,229 B1* | 11/2003 | Wuidart et al. | ............... 340/10.4 |
| 6,703,921 B1* | 3/2004 | Wuidart et al. | ............... 340/10.4 |
| 6,944,424 B2* | 9/2005 | Heinrich et al. | ............. 455/41.1 |
| 2007/0164122 A1 | 7/2007 | Ju | |
| 2008/0129509 A1* | 6/2008 | Duron | ........................ 340/572.4 |

FOREIGN PATENT DOCUMENTS

GB    2 321 725 A    8/1998

OTHER PUBLICATIONS

International Search Report dated Oct. 26, 2010 and an English language translation of the Written Opinion from corresponding International Application No. PCT/FR2010/051090.
International Search Report dated Oct. 27, 2010 and an English language translation of the Written Opinion from related International Application No. PCT/FR2010/051091.

* cited by examiner

*Primary Examiner* — Andrew Bee
(74) *Attorney, Agent, or Firm* — Seed IP Law Group PLLC

(57) ABSTRACT

A method of power recovery by an electromagnetic transponder in the field of a terminal, wherein: a ratio of the current coupling factor of the transponder with the terminal to an optimum coupling position with a resistive load value is evaluated; and a detuning of the oscillating circuit is caused if the ratio is greater than a first threshold greater than or equal to one.

27 Claims, 5 Drawing Sheets

POWER RECOVERY BY AN ELECTROMAGNETIC TRANSPONDER

CROSS REFERENCE TO RELATED APPLICATIONS

This application is a U.S. National stage patent application based on International patent application number PCT/FR2010/051090 filed on Jun. 3, 2010, which application claims the priority benefit of French patent application number 09/54148, filed on Jun. 19, 2009, which applications are hereby incorporated by reference to the maximum extent allowable by law.

BACKGROUND

1. Field

At least one embodiment generally relates to systems using transponders, that is, transceivers (generally mobile) capable of communicating contactless and wireless with a terminal.

At least one embodiment more specifically relates to the power recovery by a transponder.

2. Discussion of the Related Art

Two categories of transponders can generally be distinguished, according to whether or not they are equipped with a battery.

So-called passive transponders extract the power necessary to the operation of the electronic circuits that they comprise from a high-frequency field radiated by a terminal with which they communicate. Such transponders are generally reserved for short-distance transmissions (on the order of a few meters). The captured power from the terminal is stored by a capacitor connected to the transponder antenna.

So-called active transponders comprise a battery from which they draw the power necessary for their operation. Such transponders are capable of operating at longer range (up two a few hundred meters) since they may do without a power transfer between the terminal and the transponder. Active transponders generally take advantage of situations where they are at a small distance from a terminal to recharge their battery.

For example, document EP-A-0999517 (or U.S. Pat. No. 6,462,647) describes a rechargeable active transponder equipped with a storage capacitor for storing power originating from a received radio-electric signal, charge means being provided to recharge a battery from the power stored in the capacitor.

Document U.S. Pat. No. 6,944,424 describes an electronic tag capable of being powered by an internal battery and, passively, by a radio-frequency field. A power storage device is coupled to the battery to make its recharge possible.

The power originating from the electromagnetic coupling between the transponder and the terminal which is likely to be used to recharge the transponder battery is often insufficient and/or requires too long a recharge time to be efficient. As a result, in many cases, an active transponder stops in practice to operate at long distance once its original battery has been discharged, unless this transponder is left for a long time within the range of a terminal to be recharged, which is not always easy.

For example, in an automobile vehicle where the transponder is the vehicle key, the key remains at a short distance from the terminal contained by the vehicle all along travels. It can thus be recharged during this period. However, when the vehicle is not in use, the key is no longer within the range of the vehicle terminal and is thus not recharged.

In other applications, it is almost impossible for the transponder to remain for a long time within the range of the terminal with which it is supposed to communicate. For example, for chip cards used in transports, the time period for which the transponder is within the range of a terminal generally corresponds to the time required to perform an information exchange and does not always allow to properly recharge a battery. Further, for reasons of anti-collision of the exchanges between the many transponders and terminals which are, in this type of application, close to one another, the communication (and thus the recharge) is only established in very close coupling (less than 10 centimeters), which in practice amounts to having to lay the card on the terminal's housing in a designated area corresponding to the position closest to the antenna.

Further, transponders of a given type are generally only capable of being recharged from dedicated terminals, which is not always convenient.

Similar power recovery issues arise for passive transponders, where the power recovery is generally desired to be optimized to optimize the transmission.

SUMMARY

It would be desirable to have a transponder, a terminal of communication with transponders, and a transponder system, which overcome all or part of the disadvantages of current systems.

It would in particular be desirable to have a transponder capable of recovering power in optimized fashion by taking advantage even of short periods of exposure of the transponder to the remote-supply field.

It would in particular be desirable to have a transponder capable of recharging in optimized fashion by taking advantage of short periods of exposure of the transponder to the remote-supply field.

It would also be desirable to preserve the functionalities of an active transponder and of a passive transponder within a same device.

It would also be desirable for an active transponder to optimize its power recovery when it is within the range of different terminals without requiring dedicated terminals.

More generally, it would be desirable to optimize the exploitation by the transponder of the power that it receives from a terminal.

To achieve all or part of these and other objects, at least one embodiment provides a method of power recovery by an electromagnetic transponder in the field of a terminal, wherein:

a ratio of the current coupling factor of the transponder to a position of optimum coupling with a value of a resistive load is evaluated; and a detuning of the oscillating circuit is caused if the ratio is greater than a first threshold greater than or equal to one.

According to an embodiment, a decrease in the power consumption of the transponder circuits is caused if the ratio is smaller than a second threshold smaller than or equal to one.

According to an embodiment, an increase in the intensity of the magnetic field generated by the terminal is caused if the ratio is smaller than a second threshold smaller than or equal to one.

According to an embodiment, the ratio is obtained from data representative of a voltage across an oscillating circuit of the transponder and obtained for two resistive load values.

According to an embodiment:

first data, relative to the level of a D.C. voltage provided by a rectifier across the oscillating circuit, are measured and stored for a first value of the resistive load; and second data, relative to the level of said D.C. voltage, are measured and stored for a second resistive load value.

According to an embodiment, a variation of the resistive load between the first and second values is obtained by modifying the power consumption of processing circuits comprised by the transponder.

According to an embodiment, a variation of the resistive load between the first and second values is obtained by switching a resistive retromodulation element comprised by the transponder.

According to an embodiment, the recovered power is at least partially used to recharge a battery comprised by the transponder.

At least one embodiment also provides an electromagnetic transponder comprising:

an oscillating circuit upstream of a rectifying circuit capable of providing a D.C. voltage when the transponder is in the magnetic field of a terminal; and at least one processing unit programmed to implement the power recovery method.

According to an embodiment, the transponder further comprises at least one switchable resistive element capable of being functionally connected in parallel to the oscillating circuit.

According to an embodiment, the transponder comprises at least one switchable capacitive element for detuning the oscillating circuit.

BRIEF DESCRIPTION OF THE DRAWINGS

The foregoing and other objects, features, and advantages of at least one embodiment will be discussed in detail in the following non-limiting description of specific embodiments in connection with the accompanying drawings.

DETAILED DESCRIPTION

Figure 1:
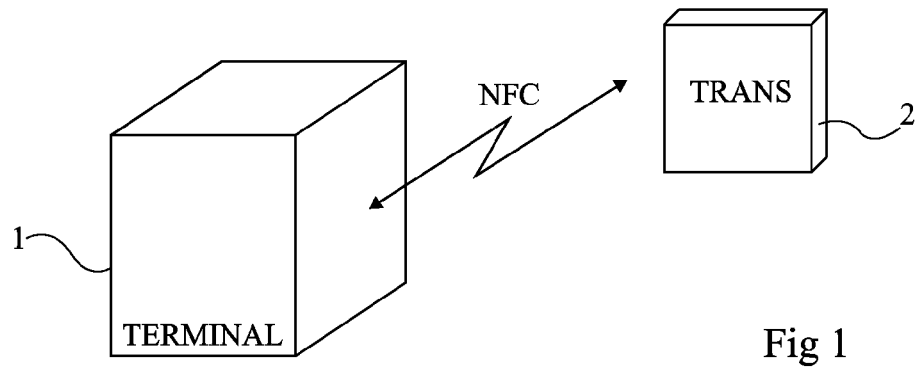
FIG. 1 is a very simplified representation of a transponder system of the type to which at least one embodiment applies as an example.

The same elements have been designated with the same reference numerals in the different drawings. For clarity, only those steps and elements which are useful to the understanding embodiments have been shown and will be described. In particular, the communications between the transponder and the terminal have not been detailed, embodiments being compatible with any usual communication. Further, the functions likely to be implemented by a terminal or by a transponder, other than the determination of the coupling factor by this transponder, have not been detailed either, embodiments being here again compatible with any usual function of a terminal or of a transponder.

At least one embodiment will be described hereafter in relation with an example of application to a rechargeable active transponder. All that will be described hereafter however also applies to a passive transponder and to the optimization of its power recovery when it is in the field of a transponder.

FIG. 1 is a block diagram of an electromagnetic transponder communication system. A terminal 1 (TERMINAL) is likely to communicate in near field (for example according to a near field communication protocol NFC) with a distant element, that is, a transponder 2 (TRANS).

The terminal may take different forms, for example, a transport ticket validation terminal, an electronic passport reader, a laptop computer, a mobile telecommunication device (cell phone, PDA, etc.), an electronic control unit for starting an automobile vehicle, etc.

The transponder may similarly take different forms, for example, a chip card, an electronic transport ticket, an electronic passport, a telecommunication terminal (cell phone, PDA, etc.), an electronic tag, etc.

Figure 2:
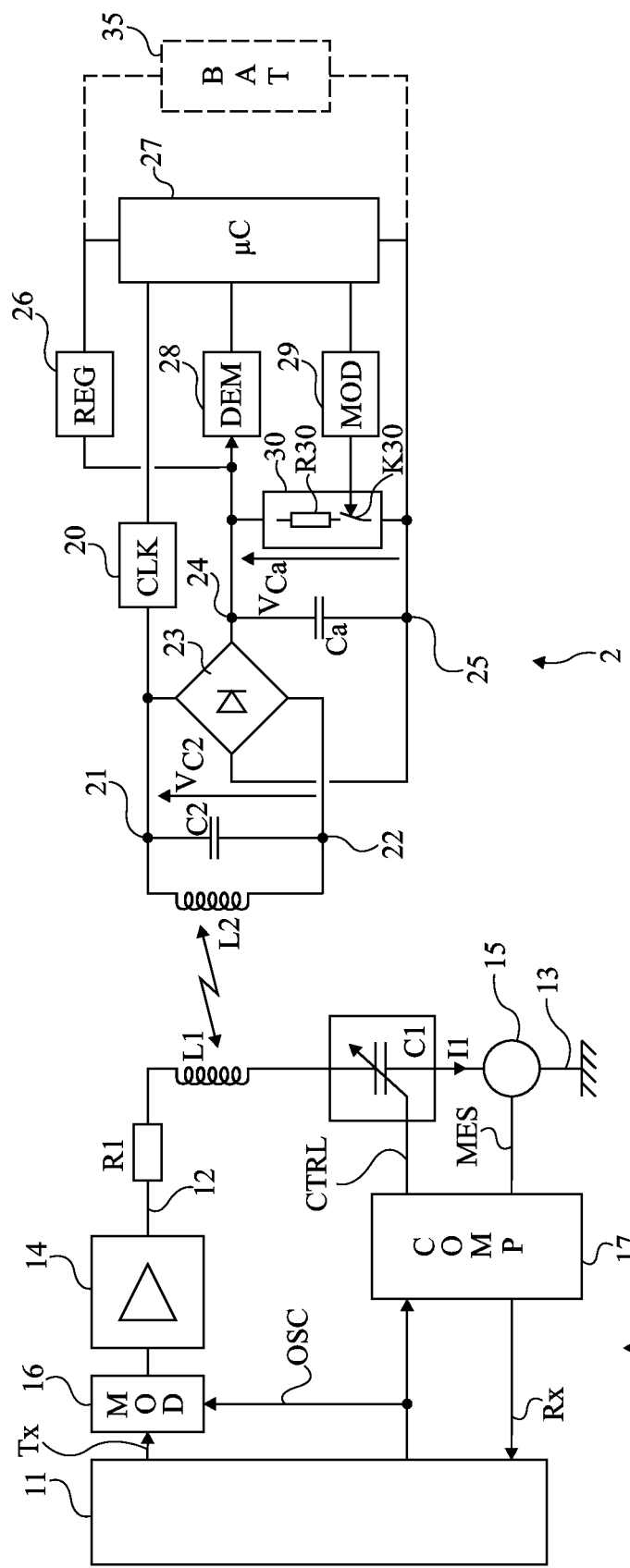
FIG. 2 is a simplified block diagram of a terminal and of a transponder of an electromagnetic transponder communication system.

FIG. 2 very schematically shows a simplified example of a terminal 1 and of a transponder 2.

Terminal 1 comprises an oscillating circuit, generally in series, formed of an inductance L1 in series with a capacitor C1 and a resistor R1. This series oscillating circuit is, in the example of FIG. 2, connected between an output terminal 12 of an amplifier or antenna coupler 14 and a terminal 13 at a reference voltage (generally the ground). An element 15 for measuring the current in the oscillating circuit is interposed, for example, between capacitive element C1 and ground 13. Measurement element 15 belongs to a phase regulation loop which will be described hereafter. Amplifier 14 receives a high-frequency transmission signal originating from a modulator 16 (MOD) which receives a reference frequency (signal OSC), for example, from a quartz oscillator (not shown). Modulator 16 receives, if need be, a signal Tx originating from a circuit 11 for controlling and exploiting the transmissions. Circuit 11 is generally provided with a control and data processing microprocessor, communicating with different input/output circuits (keyboard, display, element of exchange with a server, etc.) and/or processing circuits, which have not been detailed. The elements of terminal 1 most often draw the power necessary to their operation from a supply circuit (not shown) connected, for example, to the power line distribution system (mains) or to a battery (for example, that of an automobile vehicle or of a portable telephone or computer). Modulator 16 provides a high-frequency carrier (for example, at 13.56 MHz) to series oscillating circuit L1-C1, which generates a magnetic field.

Capacitive element C1 is, for example, a variable-capacitance element controllable by a signal CTRL. This element takes part in the phase regulation of current I1 in antenna L1 with respect to a reference signal. This regulation is a regulation of the high-frequency signal, that is, of the signal of the carrier corresponding to the signal provided to amplifier 14 in the absence of data Tx to be transmitted. The regulation is performed by varying capacitance C1 of the oscillating circuit of the terminal to maintain the current in the antenna in constant phase relationship with a reference signal. This reference signal, for example, corresponds to signal OSC provided to modulator 14. Signal CTRL originates from a circuit 17 (COMP) having the function of detecting the phase interval with respect to the reference signal and of accordingly modifying the capacitance of element C1. The comparator receives data MES relative to current I1 in the oscillating circuit detected by measurement element 15 (for example, an intensity transformer or a resistor).

A transponder 2, capable of cooperating with terminal 1, comprises an oscillating circuit, for example, parallel, formed of an inductance L2 in parallel with a capacitor C2 between two terminals 21 and 22. The parallel oscillating circuit (called receive mode resonant circuit) is intended to capture the magnetic field generated by oscillating circuit L1-C1 of terminal 1. Circuits L2-C2 and L1-C1 are tuned to a same resonance frequency (for example, 13.56 MHz). Terminals 21 and 22 are connected to two A.C. input terminals of a rectifying bridge 23 (most often, fullwave). The rectified output terminals of bridge 23 respectively define a positive terminal 24 and a reference terminal 25. A capacitor Ca is connected between terminals 24 and 25 to smooth the rectified voltage. The recovered power is used to recharge a battery, not shown.

When transponder 2 is in the field of terminal 1, a high-frequency voltage is generated across resonant circuit L2-C2. This voltage, rectified by bridge 23 and smoothed by capacitor Ca, provides a supply voltage to electronic circuits of the transponder via a voltage regulator 26 (REG). Such circuits generally comprise a processing unit 27 (for example, a microcontroller μC) associated with a memory (not shown), a demodulator 28 (DEM) of the signals that may have been received from terminal 1, and a modulator 29 (MOD) for transmitting data to the terminal. The transponder is generally synchronized by means of a clock (CLK) extracted, by a block 20, from the high-frequency signal recovered, before rectification, from one of terminals 21 and 22. Most often, all the electronic circuits of transponder 2 are integrated within a same chip.

In a passive transponder, the power is temporarily stored in capacitor Ca (or in another capacitor downstream of regulator 26). In an active transponder, a battery 35 (BAT) shown in dotted lines in FIG. 2 in parallel with the microcontroller stores the recovered power.

To transmit data from terminal 1 to the transponder, circuit 16 modulates (generally in amplitude) the carrier (signal OSC) according to signal Tx. On the side of transponder 2, these data are demodulated by demodulator 28 based on voltage $V_{Ca}$. The demodulator may sample the signal to be demodulated upstream of the rectifying bridge.

To transmit data from transponder 2 to terminal 1, modulator 29 controls a stage 30 of modulation (retromodulation) of the load formed by the transponder circuits on the magnetic field generated by the terminal. This stage is generally formed of an electronic switch K30 (for example, a transistor) and of a resistor R30 (or a capacitor), in series between terminals 24 and 25. Switch K30 is controlled at a so-called sub-carrier frequency (for example, 847.5 kHz), much lower (generally by a ratio of at least 10) than the frequency of the excitation signal of the oscillating circuit of terminal 1. When switch K30 is on, the oscillating circuit of the transponder is submitted to an additional damping with respect to the load formed by circuits 20, 26, 27, 28, and 29 so that the transponder samples a greater amount of power from the high-frequency magnetic field. On the side of terminal 1, amplifier 14 maintains the amplitude of the high-frequency excitation signal constant. Accordingly, the power variation of the transponder translates as an amplitude and phase variation of the current in antenna L1. This variation is detected by an amplitude or phase demodulator of the terminal. In the embodiment illustrated in FIG. 2, comparator 17 integrates a phase demodulator also used to demodulate the signal originating from the transponder. Accordingly, comparator 17 provides a signal Rx giving back to circuit 11 a possible retromodulation of data received from a transponder. Other demodulation circuits may be provided, for example, a circuit exploiting a measurement of the voltage across capacitor C1.

Many variations exist to encode/decode and modulate/demodulate communications between a transponder and a terminal.

The response time of the phase regulation loop is sufficiently long to avoid disturbing the possible retromodulation from a transponder and sufficiently short as compared with the speed at which a transponder passes in the field of the terminal. One can speak of a static regulation with respect to the modulation frequencies (for example, the 13.56-MHz frequency of the remote supply carrier and the 847.5-kHz retromodulation frequency used to transmit data from the transponder to the terminal).

An example of a phase regulation terminal is described in document EP-A-0857981.

The fact that the phase is regulated on the terminal side enables using current and voltage measurements in the oscillating circuit of the transponder to deduce from these measurements information relative to the transponder coupling when it is in the field of the terminal. The coupling coefficient between the oscillating circuit of the terminal and of the transponder essentially depends on the distance separating the transponder from the terminal. The coupling coefficient, noted k, always is between 0 and 1. It can be defined by the following formula:

$$k = \frac{M}{\sqrt{L1 \cdot L2}}, \quad \text{(Formula 1)}$$

where M represents the mutual inductance between inductances L1 and L2 of the oscillating circuits of the terminal and of the transponder.

An optimum coupling is defined as being the position at which voltage $V_{C2}$ across the oscillating circuit of the transponder is at its maximum. This optimum coupling, noted $k_{opt}$, may be expressed as:

$$k_{opt} = \sqrt{\frac{L2}{L1} \cdot \frac{R1}{R2}}, \quad \text{(Formula 2)}$$

where R2 represents the resistance equivalent to the load formed by the elements of the transponder on its own oscillating circuit. In other words, resistor R2 represents the equivalent resistance of all the circuits of transponder 2, placed in parallel on capacitor C2 and inductance L2 (before or after the rectifying bridge). The conductance due to the transponder circuits, and thus their consumption, will be called "resistive load". The level of this load is symbolized by resistor R2 in parallel across the oscillating circuit. In above formula 2, the series resistance of inductance L1 (terminal antenna) has been neglected. It can also be considered that the value of this series resistance is, for simplification, included in the value of resistor R1.

Figure 3:
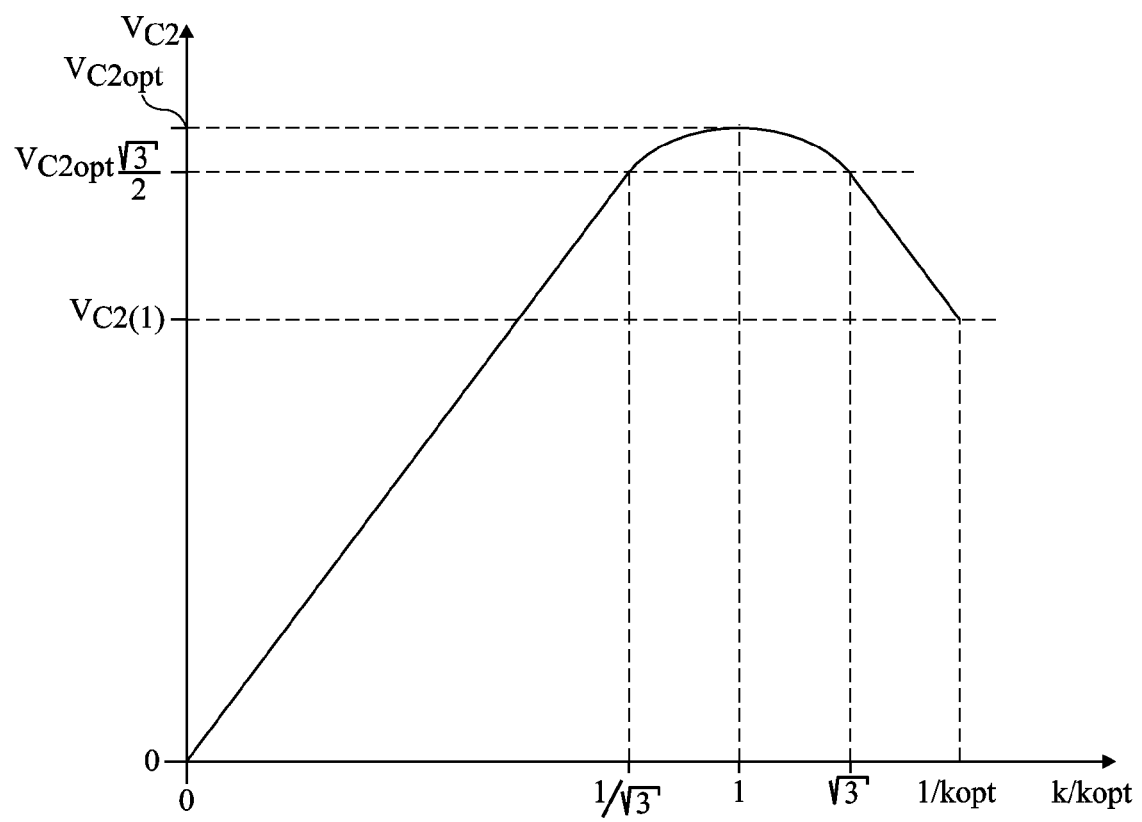
FIG. 3 illustrates an example of the shape of the voltage across the oscillating circuit of the transponder according to the coupling factor.

FIG. 3 shows an example of the shape of voltage $V_{C2}$ recovered on the transponder side according to the coupling $k/k_{opt}$ normalized with respect to the optimum coupling. The curve starts from the origin of ordinates (zero voltage) for a zero coupling. This corresponds to a distance of the transponder to the terminal such that no signal can be sensed by the transponder. Voltage $V_{C2}$ reaches a maximum $V_{C2opt}$ for optimum coupling coefficient $k_{opt}$ ($k/k_{opt}=1$), then decreases to an intermediary value $V_{C2}(1)$ reached at coupling k=1.

As illustrated in FIG. 3, voltage $V_{C2}$ crosses two points of inflection for coupling values corresponding to ratios $k/k_{opt}=1/\sqrt{3}$ and $k/k_{opt}=\sqrt{3}$, for which voltage $V_{C2}$ takes value $$V_{C2opt} \cdot \frac{\sqrt{3}}{2}.$$

To evaluate, on the transponder side, its coupling with the terminal, the information relative to voltage $V_{C2}$ across capacitive element C2 of its oscillating circuit is exploited. This voltage is provided by the following relation:

$$V_{C2} = \frac{I2}{\omega \cdot C_2}, \quad \text{(Formula 3)}$$

where I2 represents the current in the oscillating circuit of the transponder, and where ω represents the pulse of the signal.

Current I2 is equal to:

$$I2 = \frac{M \cdot \omega \cdot I1}{Z2}, \quad \text{(Formula 4)}$$

where I1 represents the current in the oscillating circuit of the terminal and where Z2 represents the transponder impedance.

Impedance Z2 of the transponder is provided by the following relation:

$$Z2^2 = X2^2 + \left(\frac{L2}{R2 \cdot C2}\right)^2, \quad \text{(Formula 5)}$$

where X2 represents the imaginary part of the impedance of the oscillating circuit $$\left(X2 = \omega \cdot L2 - \frac{1}{\omega \cdot C2}\right).$$

Further, current I1 in the oscillating circuit of the terminal is given by the following relation:

$$I1 = \frac{Vg}{Z1_{app}}, \quad \text{(Formula 6)}$$

where Vg designates a so-called generator voltage, exciting the oscillating circuit of the terminal, and where $Z1_{app}$ represents the apparent impedance of the oscillating circuit.

Regulating the phase of the oscillating circuit of the terminal enables all the variations which would tend to modify, statically with respect to the modulation frequencies, the imaginary part of the load formed by the transponder, to be compensated by the phase regulation loop. It is thus ensured that in static operation, the imaginary part of impedance $Z1_{app}$ is zero. Accordingly, impedance $Z1_{app}$ becomes equal to apparent resistance $R1_{app}$ (real part of the impedance) and may be expressed as:

$$Z1_{app} = R1_{app} = R1 + \frac{k^2 \cdot \omega^2 \cdot L1 \cdot L2^2}{Z2^2 \cdot R2 \cdot C2}. \quad \text{(Formula 7)}$$

Since the oscillating circuits are tuned, it can be considered that imaginary part X2 of impedance Z2 is, as a first approximation, close to zero. As a result, the value of impedance Z2 may be written as:

$$Z2 = \frac{L2}{R2 \cdot C2}. \quad \text{(Formula 8)}$$

By inserting this simplification into formulas 4 and 7, and inserting formula 4 into formula 3, the following formula can be obtained for voltage $V_{C2}$ recovered across the oscillating circuit of the transponder:

$$V_{C2} = k \cdot \sqrt{\frac{L1}{L2}} \cdot \frac{Vg}{\frac{R1}{R2} + k^2 \cdot \frac{L1}{L2}}. \quad \text{(Formula 9)}$$

In optimum coupling position $k_{opt}$, maximum voltage $V_{C2opt}$ is thus provided by the following formula (combining formulas 2 and 9):

$$V_{C2opt} = \frac{Vg}{2} \cdot \sqrt{\frac{R2}{R1}}. \quad \text{(Formula 10)}$$

It should be noted that formula 9 can only be applied when the oscillating circuit of transponder L2-C2 is considered to be set to the tuning frequency, that is, $\omega \cdot \sqrt{L2 \cdot C2}=1$.

By combining formulas 9 and 10 and expressing the coupling as normalized by the optimum coupling ($k/k_{opt}$), the following expression of voltage $V_{C2}$ is obtained:

$$V_{C2} = 2 \cdot V_{C2opt} \cdot \frac{\frac{k}{k_{opt}}}{1 + \left(\frac{k}{k_{opt}}\right)^2}. \quad \text{(Formula 11)}$$

For a given coupling value k, considering that the impedance of the oscillating circuit of the terminal does not vary and that the circuits remain tuned, the ratio between current coefficients k and optimum coefficients $k_{opt]R20}$ and $k_{opt]R21}$, respectively for a resistor R2 of value R20 and of value R21 provides, according to formula 2, the following expression:

$$\frac{\frac{k}{k_{opt]R20}}}{\frac{k}{k_{opt]R21}}} = \sqrt{\frac{R20}{R21}}. \quad \text{(Formula 12)}$$

Still for a given coupling value k and considering that the impedance of the oscillating circuit of the terminal does not vary and that the circuits remain tuned, the ratio between values $V_{C2]R21}$ and $V_{C2]R20}$ of voltage $V_{C2}$, respectively for values R21 and R20 of resistor R2, provides the following relation:

$$\frac{V_{C2|R21}}{V_{C2|R20}} = \frac{\left(\frac{k}{k_{opt|R20}}\right)^2 + 1}{\left(\frac{k}{k_{opt|R20}}\right)^2 + \frac{R20}{R21}}.$$ (Formula 13)

Formula 13 shows that if the value of resistor R2 is increased from a first value R20 to a second greater value R21 (which amounts to decreasing the load of the transponder circuits on oscillating circuit L2-C2), voltage $V_{C2|R21}$ will be greater than voltage $V_{C2|R20}$.

To optimize the transponder recharge, an issue is to place the transponder in a configuration corresponding to an inductive coupling generating a sufficient power source to recharge the transponder battery within an acceptable time.

Another issue is the fact that the transponder to be recharged does not know the position of its inductive coupling with respect to the optimum coupling where the maximum power is transferred from the terminal.

Formula 13 may also be written as follows:

$$\left(\frac{k}{k_{opt|R20}}\right)^2 = \frac{1 - \frac{V_{C2|R21}}{V_{C2|R20}} \cdot \frac{R20}{R21}}{\frac{V_{C2|R21}}{V_{C2|R20}} - 1}.$$ (Formula 14)

Formula 14 shows that based on a measurement of voltage $V_{C2}$ with the two resistance values R20 and R21, the ratio of the current coupling to the optimum coupling with the load equivalent to resistance R20 may be obtained, which provides direct information as to the position of the current coupling with respect to the optimum coupling with resistance R20. For this evaluation, a value R21 of resistor R2 greater than value R20 will preferably be selected.

In practice, the smoothed voltage $V_{Ca}$ across the capacitor at the output of the rectifying bridge 23 is measured rather than directly the voltage across the oscillating circuit. Voltage $V_{Ca}$ is proportional to voltage $V_{C2}$, a measurement of the smoothed voltage across the capacitor $V_{Ca}$ at the output of rectifying bridge 23 is performed. Since voltage ratios are evaluated, it is not necessary to know the proportionality factor between voltages $V_{C2}$ and $V_{Ca}$. In a specific embodiment, the measurement is performed by the microprocessor. The storage of the values of the measured voltages is performed either by analog means or, preferably, digitally over several bits, the number of which depends on the desired accuracy of analysis.

Figure 4:
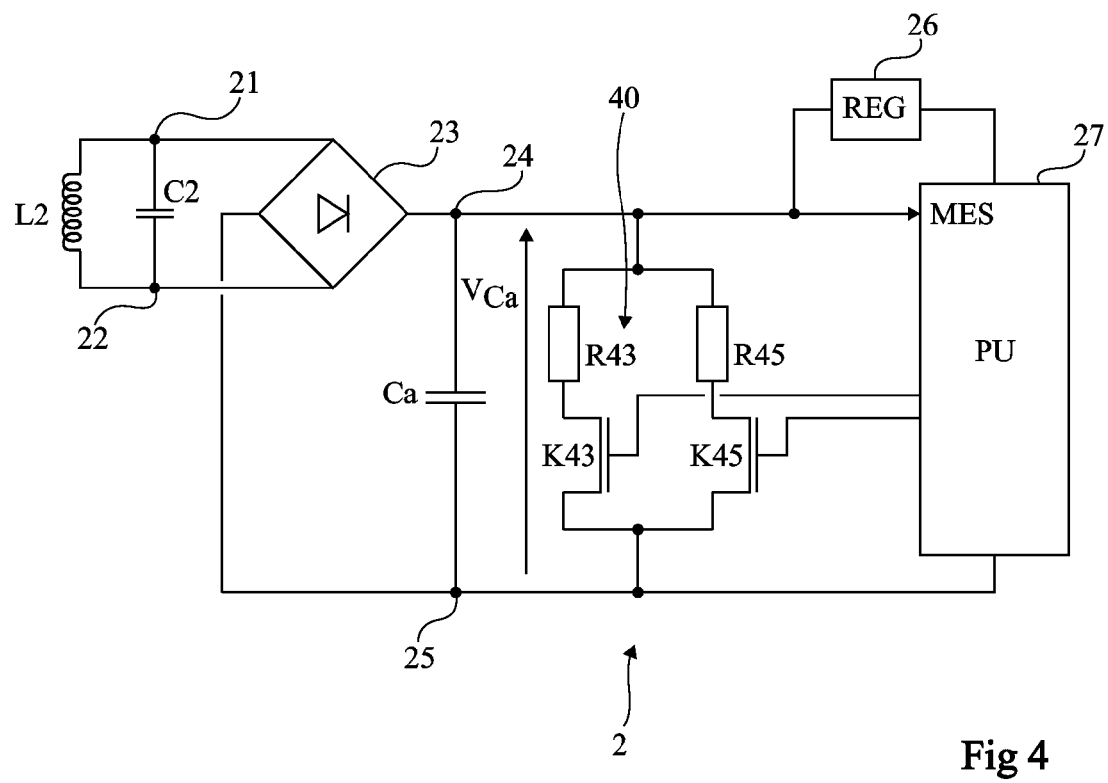
FIG. 4 is a block diagram of an embodiment of a transponder adapted to evaluating its coupling factor with a terminal.

FIG. 4 is a block diagram of an embodiment of a transponder 2, equipped to automatically determine, when it is in the field of a terminal (not shown), the current coupling with respect to the optimum coupling. The representation of FIG. 4 is simplified with respect to that of FIG. 2. In particular, the elements of demodulation, retromodulation, and for obtaining the clock frequency have not been illustrated.

As previously, transponder 2 is based on a parallel oscillating circuit L2-C2 having its terminals 21 and 22 connected to the input terminals of a rectifying bridge 23. Between terminals 24 and 25 of rectifying bridge 23, a switchable resistive circuit 40 is provided. For example, two resistors R43 and R45 are connected in parallel, each being in series with a switch K43, respectively K45. Switches K43 and K45 (for example, MOS transistors) are intended to be switched to implement the method for determining the coupling position.

Figure 5:
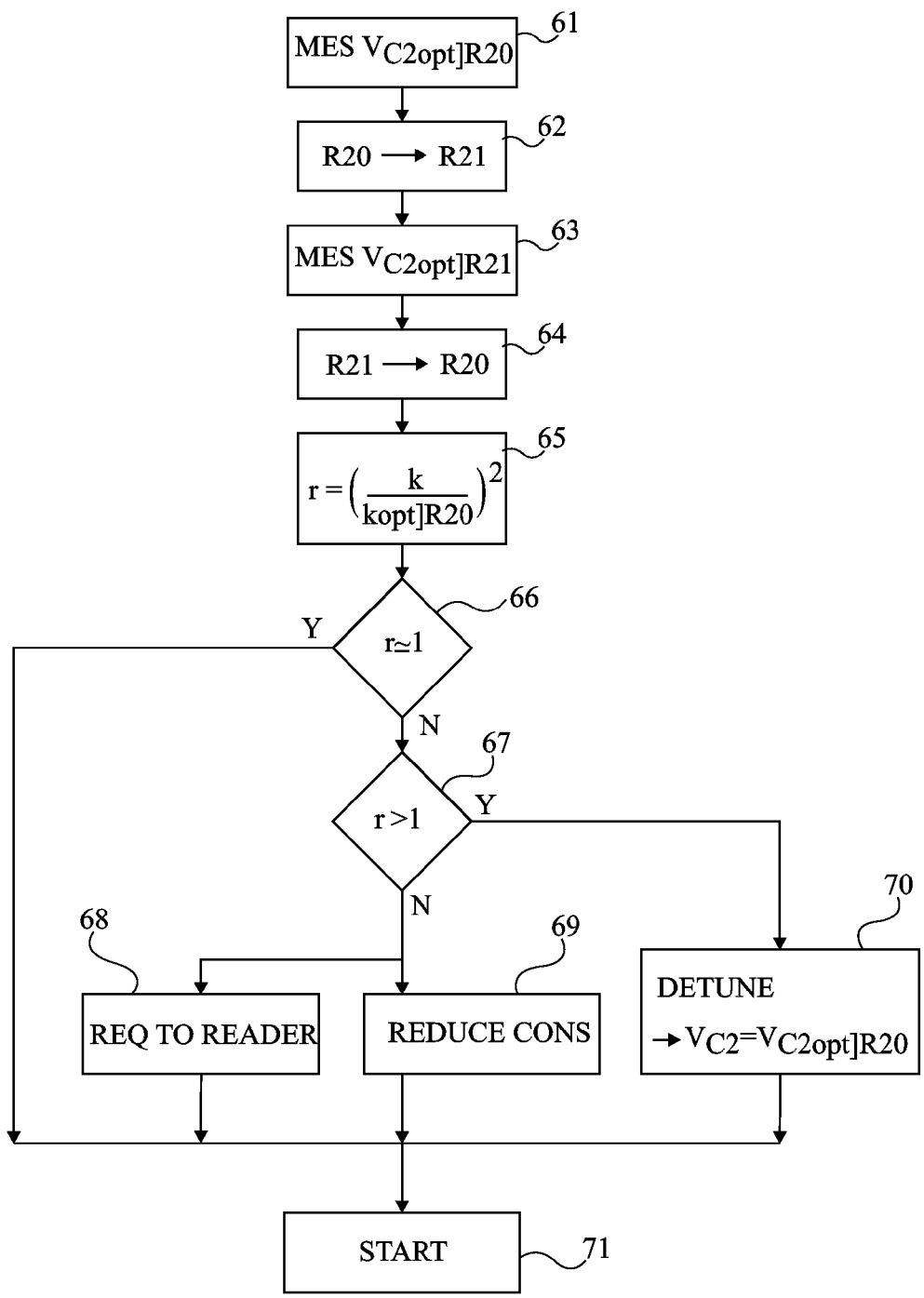
FIG. 5 is a functional block diagram illustrating an implementation mode of the recharge method.

Processing unit 27 (PU) receives information relative to voltage $V_{Ca}$ on an input MES to implement the above-described method. In the example of FIG. 5, when both resistors R43 and R45 are functionally connected, resistor R2 (load of the transponder circuits) has value R20. The disconnection of one of the resistors (for example, resistor R43) increases resistance R2 towards value R21. Other connections and switchings may be provided according to the variation of the method which is implemented. For example, a single switchable resistor may be used, considering that one of the two values of resistance R2 corresponds to the resistive load of the other transponder circuits.

According to at least one embodiment, the switchable resistor corresponds to that used for a resistive retromodulation. A first measurement is performed by switching the retromodulation resistor so that it is functionally in the circuit (switch K30 in the on state in the example of FIG. 2). Voltage $V_{C2|R20}$ is measured. Then, switch K30 is turned off and voltage $V_{C2|R21}$ is measured. The implementation of the described method then requires no structural modification of a transponder equipped with a microcontroller. It is enough to program this microcontroller so that it thus switches the retromodulation resistor.

With a value R20 of resistance R2, formula 11 may be written as (formula 15):

$$V_{C2opt|R20} = \frac{V_{C2|R20}}{2}\left(\frac{k}{k_{opt|R20}} + \frac{k_{opt|R20}}{k}\right).$$

Thus, the measurement of $V_{C2|R20}$ and the evaluation of ratio $k/k_{opt|R20}$ (Formula 14) enable to evaluate, for a given load (for a given value R20 of resistance R2), the maximum recoverable remote-supply voltage $V_{C2opt|R20}$ corresponding to a current coupling k at its optimum value.

For current couplings k lower than optimum $k_{opt}$, the maximum always occurs at the tuning.

Accordingly, for a given load value R20 and at a coupling position $k<k_{opt|R20}$, to have coupling k coincide with the optimum, the terminal may be requested to adapt its series resistance R1. Such a solution is described in European patent application EP-A-2114019 of the applicant (B8723-07-RO-225).

According to another embodiment, a decrease in the power consumption of the transponder circuits other than the transponder battery is caused (for example, by decreasing the clock frequency of the transponder). This results in decreasing the load, and thus in increasing the value of resistance R2. The current coupling of the transponder thus becomes close to the optimum position.

For current couplings k greater than optimum coupling $k_{opt}$, the voltage maximum does not occur at the tuning.

It is then provided to cause a detuning of the resonant circuit to optimize the battery charge. To achieve this, either a variable capacitive element C2, or switchable capacitive elements in parallel with capacitor C2 are provided.

The values of element C2 for which voltage $V_{C2}$ reaches maximum $V_{C2opt|R20}$ are distributed symmetrically on either side of the tuning value. Thus, to reach the voltage maximum, the resonant circuit is detuned by increase or decrease of the value of its capacitive element C2 until the time when the voltage is equal to value $V_{C2opt|R20}$. Value $V_{C2opt|R20}$ is previously evaluated based on expression 15.

FIG. 5 shows a timing diagram of an embodiment of a transponder recharge method.

The position of the current coupling with respect to the optimum coupling is first evaluated. This determination is especially used to determine whether or not the tuning should be modified or whether a variation of the power consumption is sufficient.

The coupling position is evaluated by exploiting formula 14.

In a first step (block 61, MES $V_{C2opt|R20}$), the voltage is measured and stored with a first value R20 of resistance R2.

Then (block 62, R20→R21), the resistance value is increased, for example, by switching of the resistance of a retromodulation stage.

The voltage is then measured and stored (block 63, MES $V_{C2opt|R21}$) with this load of the resonant circuit. Then, it is switched back to resistance R20 (block 64, R21→R20).

The microcontroller then exploits formula 14 to determine (block 65, $r=(k/k_{opt|R20})^2$) ratio r of current coupling k to the optimum coupling with resistance R20, $k_{opt|R20}$.

If the ratio is approximately equal to 1 (output Y of block 66, r=1), this means that the recharge (or power recovery) is optimal. Ratio r is considered as satisfactory if it is approximately equal to one (for example, ranging between 0.95 and 1.05) to allow a tolerance in the evaluations and calculations. Ratios up to $1/\sqrt{3}$ and $\sqrt{3}$, between which the variation slope of voltage $V_{C2opt}$ is lower than the slope outside of this range, might be adopted. In such a situation, the transaction is started (block 71, START) and it is considered that the recharge (or the power recovery) will be correct.

As a variation, the ratio is strictly evaluated with respect to one, with no tolerance. The risk then is to have more frequent settings/corrections since the coupling is seldom stable.

If the ratio is different from one (output N of block 66), it is determined whether it is greater than or smaller than 1 (block 67 r>1?).

If ratio r is smaller than 1, either the terminal can be requested (block 68, REQ TO READER) to increase the transmitted power, or the transponder consumption can be reduced (bloc 69, REDUCE CONS) to increase the power usable to recharge the transponder battery. The choice between one or the other of these possibilities depends on the application and especially on the will to intervene or not on the terminal. In particular, the option of block 69 requires no modification of the terminal. Options 68 and 69 may be combined.

If ratio r is greater than 1, the oscillating circuit is detuned (block 70, DETUNE→$V_{C2}=V_{C2opt|R20}$) to have the current coupling correspond to its optimum value with resistance R20. An example of a detuning circuit will be described hereafter in relation with FIG. 6. Successive settings may be performed by progressively increasing the detuning. As a variation, the microcontroller interrogates a previously-stored look-up table (for example, stored in a training phase or on design of the transponder) to know, based on the value of ratio r, the amplitude of the detuning to be introduced.

Once the setting has been performed (block 68, 69 or 70), the transaction may start.

Figure 6:
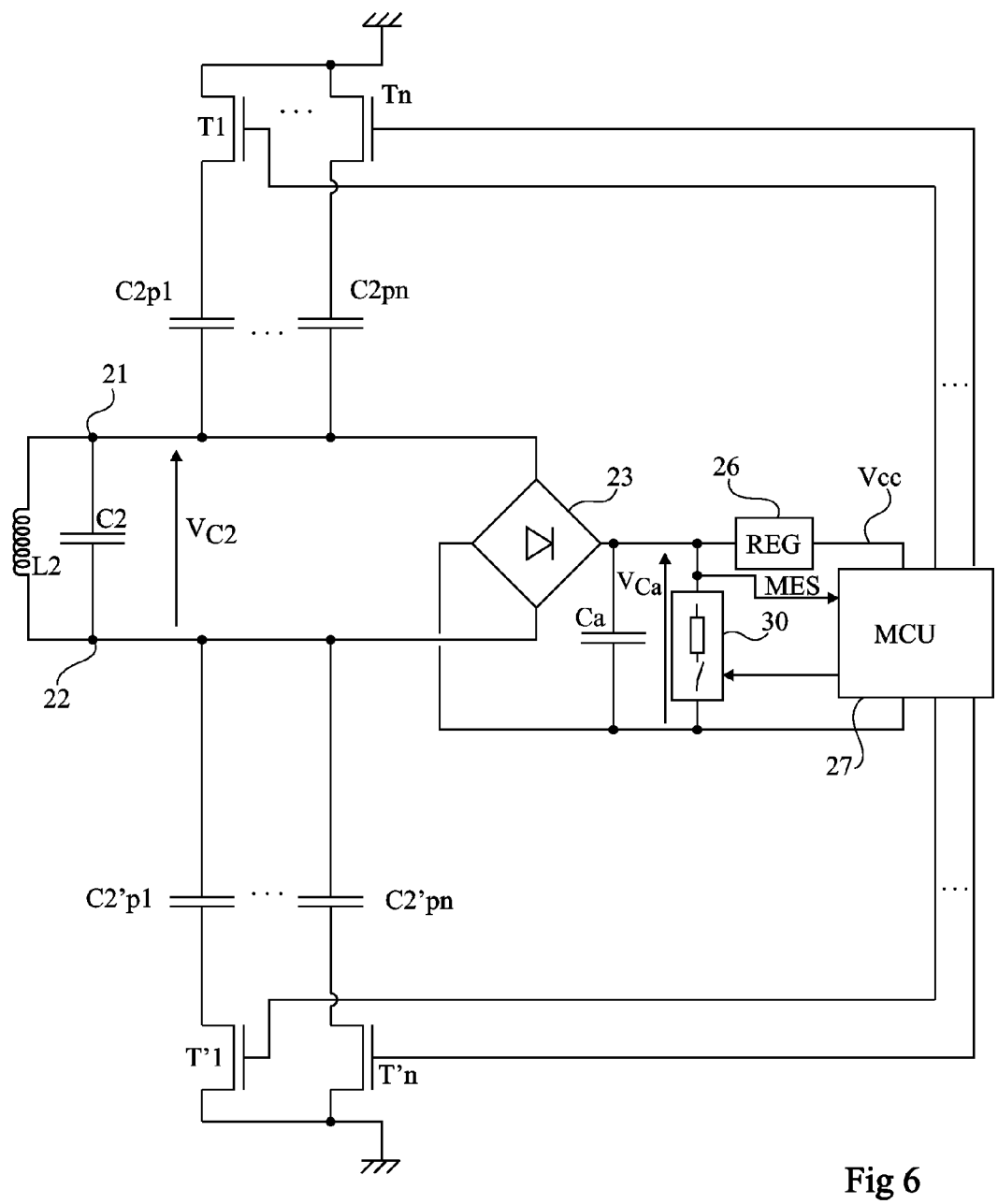
FIG. 6 is a block diagram of an embodiment of a transponder adapted to the implementation of the recharge method.

FIG. 6 shows an embodiment of a transponder equipped with a circuit for detuning capacitor C2.

As previously, transponder 2 is based on a parallel oscillating circuit L2-C2 having its terminals 21 and 22 connected to the input terminals of a rectifying bridge 23. Processing unit 27 (PU) receives information relative to voltage $V_{Ca}$ on an input MES to implement the above-described method. The detuning is obtained by increasing the capacitance of the oscillating circuit by placing in parallel capacitors C2pi and C2'pi (i ranging between 1 and n>=1) made switchable by switches (for example, MOS transistors) Ti and T'i. More specifically, at least one capacitor C2pi, respectively C2'pi, in series with a transistor Ti, respectively T'i, is connected between terminal 21, respectively 22, of resonant circuit L2-C2 and the ground. Transistors Ti are individually controllable by signals originating from microcontroller 27 according to the performed measurements conditioning the desired amplitude for the detuning. As a variation, switchable capacitors are connected in parallel on the oscillating circuit. However, an advantage of the solution of FIG. 6 is that the transistors are easier to control since the control signals may be referenced to ground.

In the example of FIG. 6, the power consumption decrease (block 69, FIG. 5) is caused by a decrease of the functions or applications used in the microcontroller, for example, by having said microcontroller operate at a lower clock frequency. The switching from value R20 to value R21 may use resistive retromodulation circuit 30, controlled in all or nothing. The measurement is particularly easy to implement. It is enough to program this microcontroller so that it thus switches the retromodulation resistance.

The calculations required to evaluate the current coupling are sufficiently simple for their execution time to be negligible as compared with the speed at which a transponder passes in front of a terminal (and thus the variation speed of the coupling coefficient). The described embodiments are further applicable to the case where the transponder remains laid on a reception surface of the terminal, and where the coupling thus does not vary during the communication.

The described embodiments enable to optimize the power recovery, be it for a direct use or to recharge a transponder battery, while avoiding the disadvantages of a systematic detuning.

The evaluation of the coupling may be performed periodically during a communication. The only precaution to be taken is not to evaluate the coupling during a retromodulation of the transponder. A first evaluation is for example performed as soon as the power recovered by the transponder is sufficient for microprocessor 27 to operate. Then, periodic measurements are performed during the communication.

It should be noted that the coupling is determined without it being necessary to establish a communication with the terminal.

Further, the value of the optimum coupling varies from one terminal to another. Evaluating the current coupling with respect to the optimum coupling such as described hereabove enables to ignore the characteristics of a given terminal and makes the evaluation independent from the terminal. Thus, a transponder equipped with means for evaluating the coupling of the invention can operate with any existing terminal.

Various embodiments with different variations have been described hereabove. It should be noted that those skilled in the art may combine various elements of these various embodiments and variations without showing any inventive step.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method, comprising:
   recovering power from a field of a terminal using an electromagnetic transponder, the recovering including:

evaluating a ratio of a current coupling factor of the transponder to a position of optimum coupling with a value of a resistive load; and detuning an oscillating circuit if the ratio is greater than a first threshold greater than or equal to one.

2. The method of claim 1, comprising decreasing a power consumption of the transponder if the ratio is smaller than a second threshold smaller than or equal to one.

3. The method of claim 1, comprising causing the terminal to increase an intensity of the field generated by the terminal if the ratio is smaller than a second threshold smaller than or equal to one.

4. The method of claim 1, wherein the ratio is obtained from data representative of a voltage across an oscillating circuit of the transponder and obtained for two values of the resistive load.

5. The method of claim 4, comprising:
measuring and storing first data, relative to a level of a D.C. voltage provided by a rectifier across the oscillating circuit, for a first value of the resistive load; and
measuring and storing second data, relative to the level of said D.C. voltage, for a second value of the resistive load.

6. The method of claim 5, comprising varying the resistive load between the first and second values by modifying a power consumption of processing circuits of the transponder.

7. The method of claim 5, comprising varying the resistive load between the first and second values by switching a resistive retromodulation element of the transponder.

8. The method of claim 1, comprising at least partially using the recovered power to recharge a battery of the transponder.

9. An electromagnetic transponder comprising:
an oscillating circuit;
a rectifying circuit downstream of the oscillating circuit and capable of providing a D.C. voltage when the transponder is in a magnetic field of a terminal; and
at least one processing unit programmed to implement a method that includes:
recovering power from the magnetic field of the terminal, the recovering including:
evaluating a ratio of a current coupling factor of the transponder to a position of optimum coupling with a value of a resistive load; and
detuning an oscillating circuit if the ratio is greater than a first threshold greater than or equal to one.

10. The transponder of claim 9, further comprising at least one switchable resistive element capable of being functionally connected in parallel to the oscillating circuit.

11. The transponder of claim 9, further comprising at least one switchable capacitive element for detuning the oscillating circuit.

12. A method for recovering power in an electromagnetic transponder, comprising:
evaluating, by a controller of the transponder, a ratio of a current coupling factor, with respect to a terminal, of the transponder to an optimum coupling factor of the transponder;
detuning, by the controller, an oscillating circuit of the transponder if the ratio is greater than a first quantity; and
decreasing, by the controller, a power consumption of at least one transponder circuit and/or requesting the terminal to increase transmitted power if the ratio is less than a second quantity.

13. A method for recovering power as defined in claim 12, wherein evaluating the ratio comprises measuring voltages across an oscillating circuit of the transponder with two different resistance values connected across the oscillating circuit, and determining the ratio from the measured voltages.

14. A method for recovering power as defined in claim 13, wherein measuring the voltages with two different resistance values comprises switching resistors connected in parallel with the oscillating circuit.

15. A method for recovering power as defined in claim 12, wherein evaluating the ratio comprises comparing the ratio with upper and lower thresholds which correspond to the first and second quantities, respectively.

16. A method for recovering power as defined in claim 12, wherein detuning the oscillating circuit comprises modifying a capacitance value of the oscillating circuit.

17. A method for recovering power as defined in claim 12, wherein decreasing the power consumption comprises decreasing a function of the controller.

18. A method for recovering power as defined in claim 12, wherein decreasing the power consumption comprises decreasing a clock frequency of the controller.

19. A method for recovering power as defined in claim 12, wherein the first quantity is 1.05 and the second quantity is 0.95.

20. A method for recovering power as defined in claim 12, further comprising taking no action if the ratio is between the first and second quantities.

21. An electromagnetic transponder comprising:
an oscillating circuit;
a rectifying circuit configured to provide a DC voltage when the oscillating circuit is in a magnetic field of a terminal; and
a processing unit configured to:
evaluate a ratio of a current coupling factor, with respect to the terminal, of the transponder to an optimum coupling factor of the transponder;
detune the oscillating circuit of the transponder if the ratio is greater than a first quantity; and
decrease a power consumption of at least one transponder circuit and/or request the terminal to increase transmitted power if the ratio is less than a second quantity.

22. An electromagnetic transponder as defined in claim 21, wherein the processing unit is configured to evaluate the ratio by measuring voltages across the oscillating circuit of the transponder with two different resistance values connected across the oscillating circuit, and determining the ratio from the measured voltages.

23. An electromagnetic transponder as defined in claim 21, wherein the processing unit is configured to evaluate the ratio by comparing the ratio with upper and lower thresholds which correspond to the first and second quantities, respectively.

24. An electromagnetic transponder as defined in claim 21, wherein the processing unit is configured to detune the oscillating circuit by modifying a capacitance value of the oscillating circuit.

25. An electromagnetic transponder as defined in claim 21, wherein the processing unit is configured to decrease the power consumption by decreasing a function of the processing unit.

26. An electromagnetic transponder as defined in claim 21, wherein the processing unit is configured to decrease the power consumption by decreasing a clock frequency of processing unit.

27. An electromagnetic transponder as defined in claim 21, wherein the processing unit is further configured to take no action if the ratio is between the first and second quantities.

* * * * *